(12) United States Patent  (10) Patent No.: US 8,247,138 B2
Abd Elhamid et al.  (45) Date of Patent: *Aug. 21, 2012

(54) METAL FLUID DISTRIBUTION PLATE WITH AN ADHESION PROMOTING LAYER AND POLYMERIC LAYER

(75) Inventors: Mahmoud H. Abd Elhamid, Grosse Pointe Woods, MI (US); Feng Zhong, Windsor (CA); Richard H. Blunk, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/222,162

(22) Filed: Aug. 31, 2011

(65) Prior Publication Data
US 2011/0311720 A1 Dec. 22, 2011

Related U.S. Application Data

(62) Division of application No. 11/180,467, filed on Jul. 13, 2005, now Pat. No. 8,017,280.

(51) Int. Cl.
*H01M 4/86* (2006.01)
(52) U.S. Cl. .................. 429/535; 429/514; 429/519
(58) Field of Classification Search ............... None
See application file for complete search history.

(56) References Cited

U.S. PATENT DOCUMENTS

| | | | |
|---|---|---|---|
| 4,214,969 A | 7/1980 | Lawrance | |
| RE37,284 E | 7/2001 | Li et al. | |
| 6,372,376 B1 * | 4/2002 | Fronk et al. | 429/487 |
| 6,440,598 B1 | 8/2002 | Fukui et al. | |
| 6,607,857 B2 | 8/2003 | Blunk et al. | |
| 6,827,747 B2 | 12/2004 | Lisi et al. | |
| 6,866,958 B2 | 3/2005 | Vyas et al. | |
| 2002/0160248 A1 | 10/2002 | Takao et al. | |
| 2003/0096151 A1 | 5/2003 | Blunk et al. | |
| 2003/0228512 A1 | 12/2003 | Vyas et al. | |
| 2003/0235711 A1 | 12/2003 | Seido et al. | |
| 2004/0005498 A1 * | 1/2004 | Eshraghi | 429/140 |
| 2004/0062974 A1 | 4/2004 | Abd Elhamid et al. | |
| 2004/0081879 A1 * | 4/2004 | Washima et al. | 429/34 |
| 2004/0081881 A1 | 4/2004 | Vyas et al. | |
| 2004/0091768 A1 | 5/2004 | Abd Elhamid et al. | |
| 2004/0137311 A1 | 7/2004 | Mathias et al. | |
| 2004/0157108 A1 | 8/2004 | Blunk et al. | |
| 2004/0253505 A1 | 12/2004 | Blunk et al. | |
| 2005/0031933 A1 | 2/2005 | Blunk et al. | |

FOREIGN PATENT DOCUMENTS

| | | |
|---|---|---|
| CN | 1331846 A | 1/2002 |
| DE | 10392349 T5 | 3/2005 |

* cited by examiner

*Primary Examiner* — Keith Walker
(74) *Attorney, Agent, or Firm* — Brooks Kushman P.C.

(57) ABSTRACT

In at least one embodiment, the present invention provides an electrically conductive fluid distribution plate and a method of making, and system for using, the electrically conductive fluid distribution plate. In at least one embodiment, the plate comprises an electrically conductive fluid distribution plate comprising a metallic plate body defining a set of fluid flow channels configured to distribute flow of a fluid across at least one side of the plate, a metal-containing adhesion promoting layer having a thickness less than 100 nm disposed on the plate body, and a composite polymeric conductive layer disposed on the metal-containing adhesion promoting layer.

14 Claims, 2 Drawing Sheets

METAL FLUID DISTRIBUTION PLATE WITH AN ADHESION PROMOTING LAYER AND POLYMERIC LAYER

CROSS-REFERENCE TO RELATED APPLICATIONS

This application is a division of U.S. application Ser. No. 11/180,467, filed Jul. 13, 2005, now U.S. Pat. No. 8,017,280, issued Sep. 13, 2011, the disclosure of which is incorporated in its entirety by reference herein.

BACKGROUND OF THE INVENTION

1. Field of the Invention

The present invention relates generally to an electrically conductive metal fluid distribution plate, a method of making an electrically conductive metal fluid distribution plate, and systems using an electrically conductive metal fluid distribution plate according to the present invention. More specifically, the present invention is related to the use of an electrically conductive metal fluid distribution plate in addressing contact resistance and water transport difficulties in fuel cells and other types of devices and to wet adhesion of organic coatings on fluid distribution plates.

2. Background Art

Fuel cells are being developed as a power source for many applications including vehicular applications. One such fuel cell is the proton exchange membrane or PEM fuel cell. PEM fuel cells are well known in the art and include in each cell thereof a membrane electrode assembly or MEA. The MEA is a thin, proton-conductive, polymeric, membrane-electrolyte having an anode electrode face formed on one side thereof and a cathode electrode face formed on the opposite side thereof. One example of a membrane-electrolyte is the type made from ion exchange resins. An exemplary ion exchange resin comprises a perfluorinated sulfonic acid polymer such as NAFION™ available from the E.I. DuPont de Nemeours & Co. The anode and cathode faces, on the other hand, typically comprise finely divided carbon particles, very finely divided catalytic particles supported on the internal and external surfaces of the carbon particles, and proton conductive particles such as NAFION™ intermingled with the catalytic and carbon particles; or catalytic particles, without carbon, dispersed throughout a polytetrafluorethylene (PTFE) binder.

Multi-cell PEM fuel cells comprise a plurality of the MEAs stacked together in electrical series and separated one from the next by a gas-impermeable, electrically-conductive fluid distribution plate known as a separator plate or a bipolar plate. Such multi-cell fuel cells are known as fuel cell stacks. The bipolar plate has two working faces, one confronting the anode of one cell and the other confronting the cathode on the next adjacent cell in the stack, and electrically conducts current between the adjacent cells. Electrically conductive fluid distribution plates at the ends of the stack contact only the end cells and are known as end plates. The bipolar plates contain a flow field that distributes the gaseous reactants (e.g. $H_2$ and $O_2$/air) over the surfaces of the anode and the cathode. These flow fields generally include a plurality of lands which define therebetween a plurality of flow channels through which the gaseous reactants flow between a supply header and an exhaust header located at opposite ends of the flow channels.

A highly porous (i.e. ca. 60% to 80%), electrically-conductive material (e.g. cloth, screen, paper, foam, etc.) known as "diffusion media" is generally interposed between electrically conductive fluid distribution plates and the MEA and serves (1) to distribute gaseous reactant over the entire face of the electrode, between and under the lands of the electrically conductive fluid distribution plate, and (2) collects current from the face of the electrode confronting a groove, and conveys it to the adjacent lands that define that groove. One known such diffusion media comprises a graphite paper having a porosity of about 70% by volume, an uncompressed thickness of about 0.17 mm, and is commercially available from the Toray Company under the name Toray 060. Such diffusion media can also comprise fine mesh, noble metal screen and the like as is known in the art.

In an $H_2$—$O_2$/air PEM fuel cell environment, the electrically conductive fluid distribution plates can typically be in constant contact with mildly acidic solutions (pH 3-5) containing $F^-$, $SO_4^{--}$, $SO_3^-$, $HSO_4^-$, $CO_3^{--}$, and $HCO_3^-$, etc. Moreover, the cathode typically operates in a highly oxidizing environment, being polarized to a maximum of about +1 V (vs. the normal hydrogen electrode) while being exposed to pressurized air. Finally, the anode is typically constantly exposed to hydrogen. Hence, the electrically conductive fluid distribution plates should be resistant to a hostile environment in the fuel cell.

One of the more common types of suitable electrically conductive fluid distribution plates include those made of metal, such as stainless steel, coated with polymer composite materials containing about 30% to about 40% by volume conductive particles. In this regard, see U.S. Pat. No. 6,372,376 to Fronk et al., issued Apr. 16, 2002, which (1) is assigned to the assignee of this invention, (2) is incorporated herein by reference, and (3) discloses electrically conductive fluid distribution plates made from metal sheets coated with a corrosion-resistant, electrically-conductive layer comprising a plurality of electrically conductive, corrosion-proof (i.e. oxidation-resistant and -acid resistant) filler particles dispersed throughout a matrix of an acid-resistant, water insoluble, oxidation-resistant polymer that binds the particles together and to the surface of the metal sheet. Fronk et al-type composite coatings will preferably have a resistivity no greater than about 50 ohm-cm and a thickness between about 5 microns and 75 microns depending on the composition, resistivity and integrity of the coating. The thinner coatings are preferred to achieve lower IR drop through the fuel cell stack.

While metal plates coated with conductive polymeric composite material have been found to provide electrically conductive fluid distribution plates having acceptable corrosion resistance and contact resistance, applicants have found the adhesion of the polymeric coating to some metal plates, such as those made of stainless steel and nickel-based alloys, to be relatively weak due to the relative inertness of the metal surface. While these types of plates currently have acceptable coating adhesion properties, there is a desire to provide a polymeric coated metal electrically conductive fluid distribution plate having increased coating adhesion properties.

SUMMARY OF THE INVENTION

In at least one embodiment, an electrically conductive fluid distribution plate is provided comprising a metallic plate body defining a set of fluid flow channels configured to distribute flow of a fluid across at least one side of the plate, a metal-containing adhesion promoting layer having a thickness less than 100 nm disposed on the plate body, and a composite polymeric conductive layer disposed on the metal-containing adhesion promoting layer.

In yet another embodiment, a method of manufacturing a fluid distribution plate is provided comprising providing a metallic plate body having a body defining a set of fluid flow channels configured to distribute flow of a fluid across at least one side of the plate, providing a metal-containing adhesion promoting layer having a thickness less than 100 nm on the plate body, and providing a composite polymeric conductive layer on the metal-containing adhesion promoting layer.

In still yet another embodiment, a fuel cell is provided. In at least one embodiment, the fuel cell comprises a first electrically conductive fluid distribution plate comprising a metallic plate body defining a set of fluid flow channels configures to distribute flow of a fluid across at least one side of the plate, a metal-containing adhesion promoting layer having a thickness less than 100 nm disposed on the plate body, and a composite polymeric conductive layer disposed on the metal-containing adhesion promoting layer. The fuel cell further includes a second electrically conductive fluid distributing plate, and a membrane electrode assembly separating the first electrically conductive fluid distribution plate and the second electrically conductive fluid distribution plate, the membrane electrode assembly comprising an electrolyte membrane, having a first side and a second side, an anode adjacent to the first side of the electrolyte membrane, and a cathode adjacent to the second side of the electrolyte membrane.

The present invention will be more fully understood from the following description of preferred embodiments of the invention taken together with the accompanying drawings. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE PREFERRED EMBODIMENTS

The following description of the preferred embodiments is merely exemplary in nature and is in no way intended to limit the invention, its application, or uses. Reference will now be made in detail to presently preferred compositions, embodiments and methods of the present invention, which constitute the best modes of practicing the invention presently known to the inventors. The figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative bases for the claims and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and to normal grammatical variations of the initially defined abbreviation; and, unless expressly stated to the contrary, measurement of a property is determined by the same technique as previously or later referenced for the same property.

Figure 1:
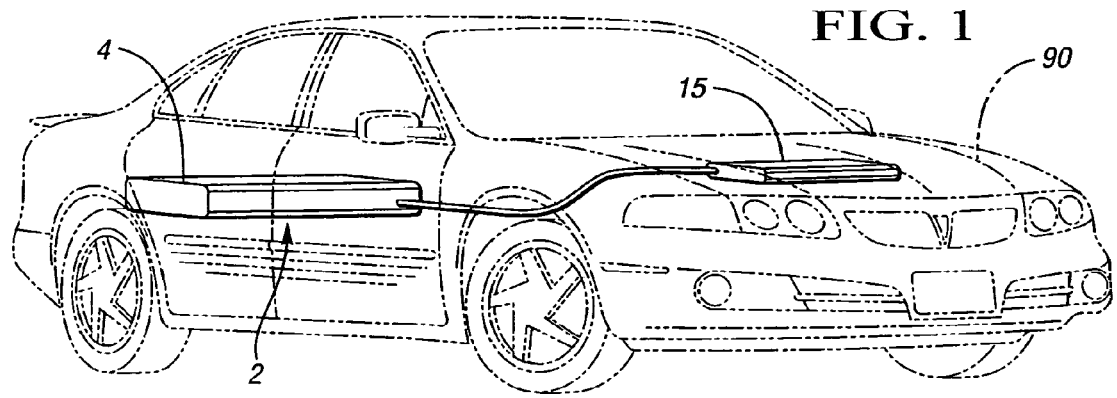
FIG. 1 is a schematic illustration of a vehicle including a fuel cell system.

Referring to FIG. 1, an exemplary fuel cell system 2 for automotive applications is shown. It is to be appreciated, however, that other fuel cell system applications, such as for example, in the area of residential systems, may benefit from the present invention.

In the embodiment illustrated in FIG. 1, a vehicle is shown having a vehicle body 90, and an exemplary fuel cell system 2 having a fuel cell processor 4 and a fuel cell stack 15. A discussion of embodiments of the present invention as embodied in a fuel cell stack and a fuel cell, is provided hereafter in reference to FIGS. 2-3. It is to be appreciated that while one particular fuel cell stack 15 design is described, the present invention may be applicable to any fuel cell stack designs where fluid distribution plates have utility.

Figure 2:
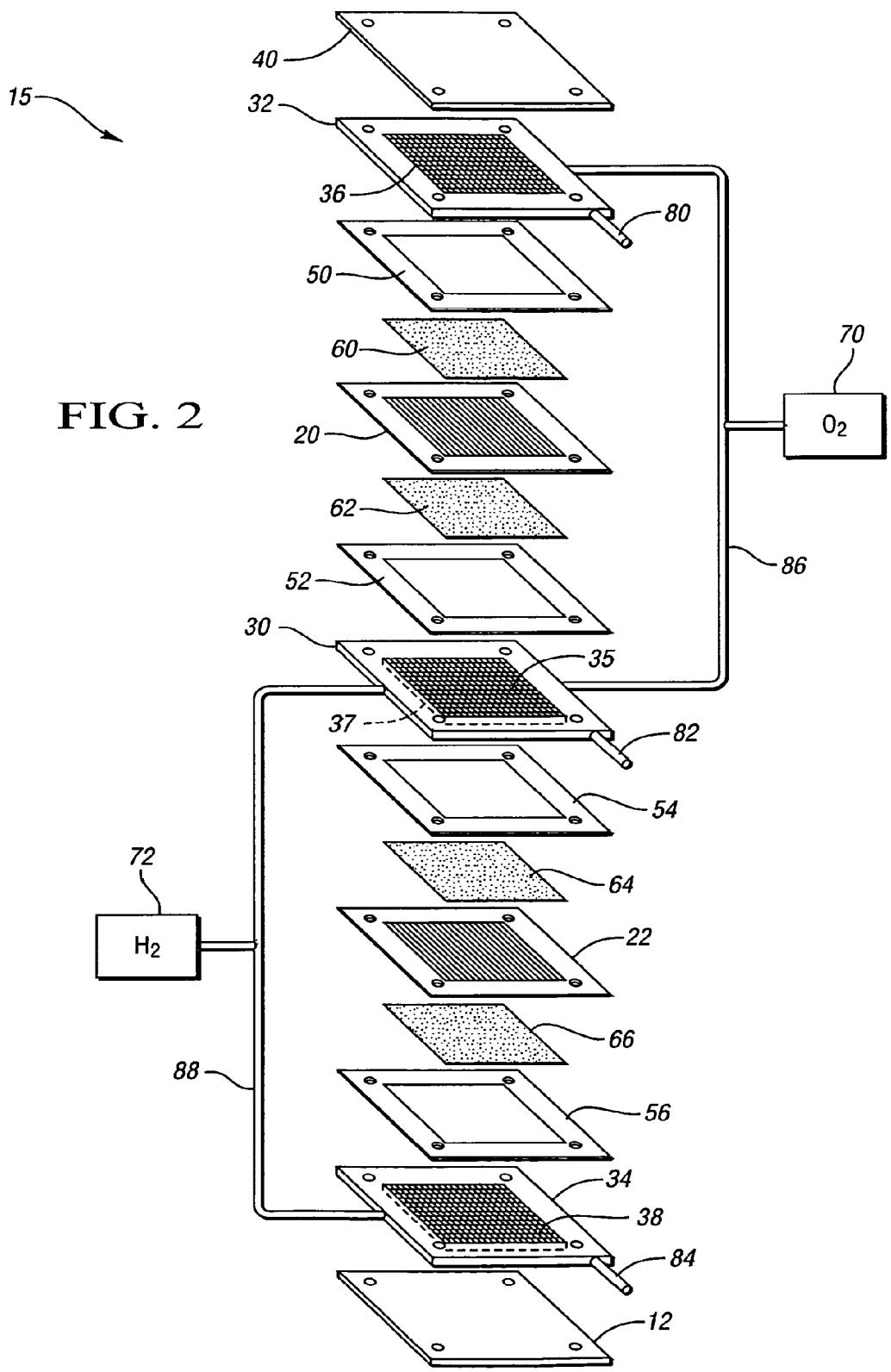
FIG. 2 is a schematic illustration of a fuel cell stack employing two fuel cells.

FIG. 2 depicts a two fuel cell, fuel cell stack 15 having a pair of membrane-electrode-assemblies (MEAs) 20 and 22 separated from each other by an electrically conductive fluid distribution plate 30. Plate 30 serves as a bi-polar plate having a plurality of fluid flow channels 35, 37 for distributing fuel and oxidant gases to the MEAs 20 and 22. By "fluid flow channel" we mean a path, region, area, or any domain on the plate that is used to transport fluid in, out, along, or through at least a portion of the plate. The MEAs 20 and 22, and plate 30, may be stacked together between clamping plates 40 and 42, and electrically conductive fluid distribution plates 32 and 34. In the illustrated embodiment, plates 32 and 34 serve as end plates having only one side containing channels 36 and 38, respectively, for distributing fuel and oxidant gases to the MEAs 20 and 22, as opposed to both sides of the plate.

Nonconductive gaskets 50, 52, 54, and 56 may be provided to provide seals and electrical insulation between the several components of the fuel cell stack. Gas permeable carbon/graphite diffusion papers 60, 62, 64, and 66 can press up against the electrode faces of the MEAs 20 and 22. Plates 32 and 34 can press up against the carbon/graphite papers 60 and 66 respectively, while the plate 30 can press up against the carbon/graphite paper 64 on the anode face of MEA 20, and against carbon/graphite paper 60 on the cathode face of MEA 22.

In the illustrated embodiment, an oxidizing fluid, such as $O_2$, is supplied to the cathode side of the fuel cell stack from storage tank 70 via appropriate supply plumbing 86. While the oxidizing fluid is being supplied to the cathode side, a reducing fluid, such as $H_2$, is supplied to the anode side of the fuel cell from storage tank 72, via appropriate supply plumbing 88. Exhaust plumbing (not shown) for both the $H_2$ and $O_2$/air sides of the MEAs will also be provided. Additional plumbing 80, 82, and 84 is provided for supplying liquid coolant to the plate 30 and plates 32 and 34. Appropriate plumbing for exhausting coolant from the plates 30, 32, and 34 is also provided, but not shown.

Figure 3:
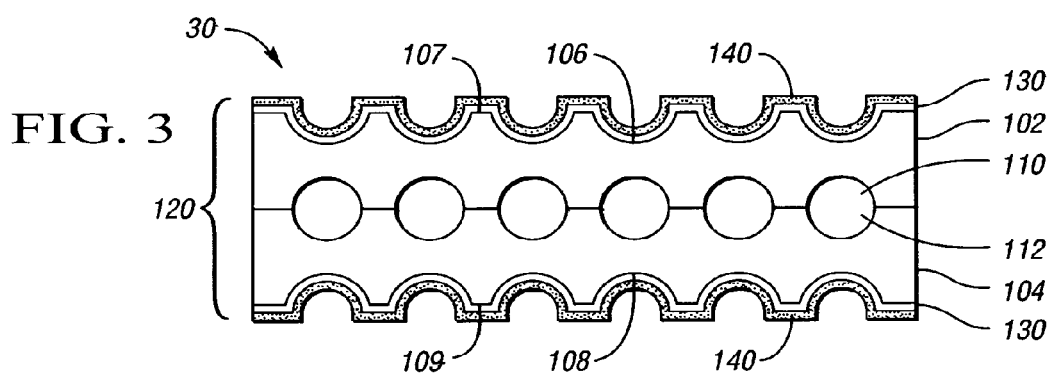
FIG. 3 is an illustration of an electrically conductive fluid distribution plate according to an embodiment of the present invention.

FIG. 3 illustrates an exemplary electrically conductive fluid distribution plate 30 comprising a first sheet 102 and a second sheet 104. First and second sheets 102, 104 comprise a plurality of fluid flow channels 106, 108 on their exterior sides/surfaces through which the fuel cell's reactant gases flow typically in a tortuous path along one side of each plate. First and second sheets 102, 104 also comprise a plurality of lands 107, 109, adjacent the channels 106, 108. The interior sides of the first and second sheets 102, 104 may include a second plurality fluid flow channels 110, 112 through which coolant passes during the operation of the fuel cell. When the interior sides of first sheet 102 and second sheet 104 are placed together to form a plate body 120, the fluid flow channels connect and form a series of channels for coolant to pass through the plate 30.

The plate body 120 may be formed from a single sheet, or plate, rather than the two separate sheets illustrated in FIG. 3. When the plate body 120 is formed from a single plate, the channels may be formed on the exterior sides of the plate body 120 and through the middle of the plate body 120 such that the resulting plate body 120 is equivalent to the plate body 120 configured from two separate sheets 102, 104.

The plate body 120 may be formed from a metal or metal alloy and has to be conductive. In one embodiment, a passivating metal or a passivating alloy forms the plate body 120. By "passivating metal" or "passivating alloy" we mean a metal or an alloy that forms a passivating layer as a result of reaction with ambient substances such as air or water. However, if a passivating metal is to be used, in at least one embodiment, it is preferred that any formed passivating layer be relatively thin so as not to significantly increase the contact resistance of the plate 30.

Suitable metals and metal alloys should be characterized by sufficient durability and rigidity to function as a fluid distribution plate in a fuel cell. Additional design properties for consideration in selecting a material for the plate body include gas permeability, conductivity, density, thermal conductivity, corrosion resistance, pattern definition, thermal and pattern stability, machinability, cost and availability. Available metals and alloys include stainless steel, nickel based alloys, and combinations thereof.

First and second sheets 102, 104 are typically between about 50 to about 250 (microns) thick. The sheets 102, 104 may be formed by machining, rotary die forming, cutting, stamping, photo etching such as through a photolithographic mask, chemical etching or any other suitable design and manufacturing process. It is contemplated that the sheets 102, 104 may comprise a laminate structure including a flat sheet and an additional sheet including a series of exterior fluid flow channels. An interior metal spacer sheet (not shown) may be positioned between the first and second sheets 102, 104.

In the schematically illustrated plate 30 of FIG. 3, the substrate 102, 104 forming the structural component of the body 120 comprises a corrosion-resistant metallic material such as stainless steel, nickel based alloys, and combinations thereof. The working faces of the plate 30 are covered with a conductive polymeric composite coating 140. In at least one embodiment, the conductive polymeric coating 140 comprises an electrically-conductive, oxidation resistant, and acid-resistant protective material having a resistivity less than about 50 ohm-$cm^2$, and comprises a plurality of oxidation-resistant, acid-insoluble, conductive filler particles (i.e. less than about 50 microns) dispersed throughout an acid-resistant, oxidation-resistant polymer matrix. Any suitable conductive polymeric coating 140 may be employed. In at least one embodiment, the conductive polymeric coating has a thickness of 5 to 45 microns, and in other embodiments of 10 to 30 microns. Suitable examples of such coatings and their manner of application can be found in U.S. Pat. No. 6,372,376.

In at least one embodiment, the conductive filler particles can be selected from the group consisting of gold, platinum, graphite, carbon, palladium, niobium, rhodium, ruthenium, and the rare earth metals. In at least certain embodiments, the particles may comprise conductive carbon and graphite at a loading of 25% by weight. The polymer matrix may comprise any water-insoluble polymer that can be formed into a thin adherent film and that can withstand the hostile oxidative and acidic environment of the fuel cell. Hence, such polymers, as epoxies, polyamide-imides, polyether-imides, polyphenols, fluoro-elastomers (e.g., polyvinylidene fluoride), polyesters, phenoxy-phenolics, epoxide-phenolics, acrylics, and urethanes, inter alia are seen to be useful with the composite coating. Cross-linked polymers may be employed for producing less permeable coatings, with polyamide-imide thermosetting/thermoplastic polymers being most preferred.

In at least one embodiment, the conductive polymeric layer 140 may be applied by dissolving polyamide-imide in a solvent comprising a mixture of N-methylpyrrolidone, propylene glycol and methyl ether acetate, and 21% to 23% by weight of a mixture of graphite and carbon black particles added thereto. In at least one embodiment, the graphite particles may range in size from 5 microns to 20 microns and the carbon black particles may range in size from 0.5 micron to 1.5 microns. In at least one embodiment, the mix may be sprayed on to the substrate, dried (i.e. solvent vaporized), and cured to provide 10 to 30 micron thick coating having a carbon-graphite content of up to 38% by weight. It may be cured slowly at low temperatures (i.e. <400° F.), or more quickly in a two step process wherein the solvent is first removed by heating for ten minutes at about 300° F. to 350° F. (i.e., dried) followed by higher temperature heating (500° F. to 750° F.) for various times ranging from about ½ min to about 15 min (depending on the temperature used) to cure the polymer. Alternatively, the coating can be IR dried/cured.

In the embodiment illustrated in FIG. 3, the electrically conductive fluid distribution plate 30 includes a metal-containing adhesion promoting coating 130 disposed between the sheets 102, 104 and the conductive polymeric coating 140. While metal-containing adhesion promoting coating 130 can extend over substantially the entire outer surface of plate 30, as schematically illustrated in FIG. 3, the metal-containing adhesion promoting coating 130 can also extend over less than the entire outer surface.

Applicants have found that providing an electrically conductive distribution plate 30 having the metal-containing adhesion promoting coating 130 disposed between the sheets 102, 104 and the conductive polymeric coating 140 can result in an electrically conducted distribution plate having excellent contact resistance and water transport properties as well as excellent wet adhesion of the conductive polymeric coatings 140 to the plate 30. In at least one embodiment, the metal-containing adhesion promoting coating 130 comprises a metal layer comprising a valve metal. It is contemplated that the metal-containing adhesion promoting coating 130 can comprise a pure valve metal layer, and other valve metal-containing alloy layers. In at least some embodiments, particularly suitable valve metals include titanium, zirconium, niobium, tantalum, and mixtures thereof. In at least certain embodiments, titanium is especially suitable.

The metal-containing adhesion promoting coating 130 has a thickness of less than 100 nm. In at least some embodiments, the metal-containing adhesion promoting coating 130 has a thickness of less than 75 nm, and in other embodiments between 1 and 60 nm, and in yet other embodiments between 5 and 45 nm. While the metal-containing adhesion promoting coating 130 can be supplied to the plate 30 in any suitable manner, one particularly suitable approach is to deposit the metal-containing adhesion promoting coating 130 onto plate 30 via a physical vapor deposition process. Applicants have found that the use of the metal-containing adhesion promoting coating 130 results in excellent adhesion of the composite coating 140 to the plate 30. In at least certain embodiments, the composite coating 140 will adhere to the plate 30 for at least 2,000 hours (of fuel cell use), and in other embodiments for at least 4,000 hours, and in yet other embodiments for at least 6,000 hours.

Figure 4:
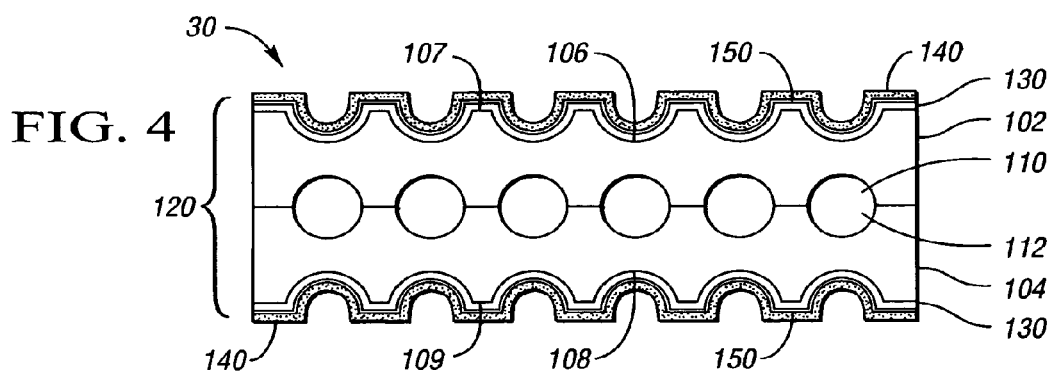
FIG. 4 is an illustration of an electrical conductive fluid distribution plate according to another embodiment of the present invention.

Applicants have also found that the metal-containing adhesion promoting coating can also help to improve the water management property of the plate 30. In some embodiments, the valve metal layer 130 disposed between plate 30 and the conductive polymeric coating 140, may over time have a minor amount transform, such as by oxidation, into a valve metal oxide layer. The valve metal oxide layer is a relatively hydrophilic non-stoichic metallic conductive passive film. Referring to FIG. 4, in these embodiments, the outer surface portion 150 of the coating 130 is what transforms into the valve metal oxide layer. In at least one embodiment, the outer surface portion 150 comprises 0.01 to 2.5%, by volume, of the metal-containing adhesion promoting coating 130, in other embodiments 0.05 to 1.5%, and in yet other embodiments 0.1 to 1%. When the outer portion of the metal-containing adhesion promoting coating 130 includes the valve metal oxide outer surface portion 150, the coating 130 is relatively hydrophilic resulting in a high spreading pressure of the plate 30. In at least certain embodiments, when the metal-containing adhesion promoting coating 130 includes the valve metal oxide outer surface portion 150, the spreading pressure of the plate 30 is at least 200 dyne/centimeter, in at least other embodiments between 225 and 375 dyne/centimeter, and in yet other embodiments between 275 and 325 dyne/centimeter. Plates having spreading pressures in these ranges can provide good wicking properties and can help remove water from the stack. Also, plates having valve metal oxide layers in the above volumes will not appreciably increase the total contact resistance of the plate.

The conductive polymeric coating 140 may be applied directly to the coating 130 and allowed to dry/cure thereon. The composite layer 140 may be applied in a variety of ways, e.g., brushing, spraying, spreading, or laminating, coil coating, or roll coating a preformed film onto the substrate. Since the metal-containing adhesion promoting coating 130 can form a non-stoichiometric conductive passive films that does not appreciably increase the plates 30 overall contact resistance, the deposition of the polymeric coating 140 can take place after a relatively lengthly delay from the deposition of the metal-containing adhesion promoting coating 130. Such delays can be at least 24 hours, in other embodiments at least 72 hours, and in at least yet other embodiments at least 168 hours.

Figure 5:
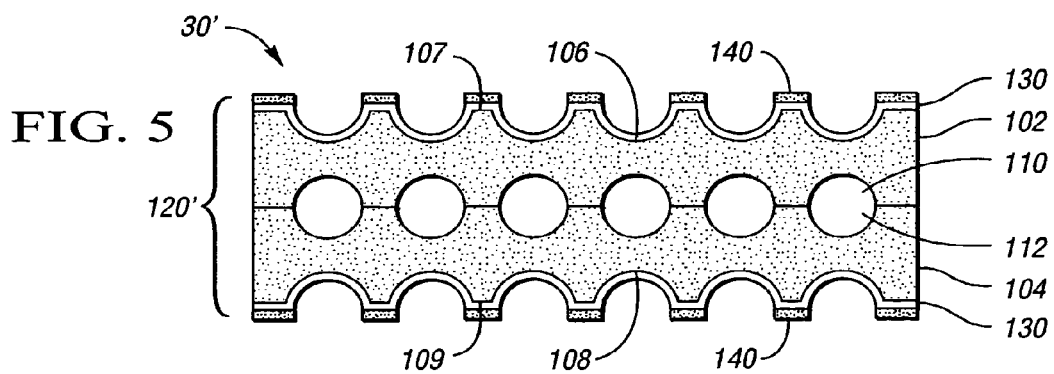
FIG. 5 is an illustration of an electrical conductive fluid distribution plate according to another embodiment of the present invention.

FIG. 5 illustrates another embodiment of the present invention. The plate 30' and the body 120' illustrated in FIG. 5 are similar in construction and use to the plate 30 and the body 120 illustrated in FIG. 3. Parts of the plate 30' that are substantially the same as the corresponding parts in plate 30 illustrated in FIG. 3 are given the same reference numeral and the parts of the plate 30' that are substantially different than the corresponding parts in the plate 30 are given the same part number with the suffix "prime" added for clarity.

In at least one embodiment, the conductive polymeric coating 140 is not applied over the channels 106, 108 of plate 30'. Thus, the channels 106, 108 are at least substantially devoid of conductivity polymeric coating 140, and in at least one embodiment are entirely devoid. Either the polymeric coating 140 can be selectively deposited only substantially onto the lands 107, 109 or the channels 106, 108 could be suitably masked during deposition of the polymeric coating 140 onto the plate 30' so that at least substantially no polymeric coating is deposited into the channels 106, 108. In this embodiment, the channels 106, 108 can be relatively more hydrophilic than the lands 107, 109 thereby enhancing the water management capabilities of the plate 30' by providing relatively more efficient water removal paths.

In at least certain embodiments, an electrically conductive fluid distribution plate according to the various embodiments of the present invention has excellent contact resistance and coating adhesion properties. In at least certain embodiments, an electrically conductive fluid distribution plate according to the various embodiments of the present invention has excellent water management properties.

In at least certain embodiments, an electrically conductive fluid distribution plate according to the various embodiments of the present invention has excellent processability due at least to the ability to delay depositing the polymeric coating relative to the deposition of the metal-containing adhesion promoting coating. In at least certain embodiments, an electrically conductive fluid distribution plate according to various embodiments of the present invention has excellent processability also because the use of the metal-containing adhesion promoting coating can enable deposition of the polymeric coating onto plate without any cathodic cleaning or etching, although in some embodiments a pre-sputtering step of the sheets or the use of clean sheets directly from a bright annealing furnace may be helpful to maintain a low contact resistance.

It should be understood that the principles of the present invention apply equally as well to unipolar plates and bipolar plates.

The present invention will be further explained by way of example. It is to be appreciated that the present invention is not limited by the example.

EXAMPLE

Some stainless steel plates are pre-sputtered for five minutes in an argon atmosphere at $10^{-2}$ Torr (−500 bias voltage) to remove any naturally occurring passivating and insulating oxides. The plates are then coated with a 10-30 nm titanium layer and subsequently sprayed with a conductive polymeric coating such as those disclosed in U.S. Pat. No. 6,372,376. Subsequently, the organic polymeric coatings are applied to the plates after deposition of the titanium to help prevent the natural growth of oxides. The plates are then soaked in a simulated fuel cell solution of pH=3 at 90° C. for 20 weeks.

The plates exhibit no significant debonding failures after 20 weeks of soaking in the simulated fuel cell solution in accordance with the tape adhesive test (ASTM No. D 3359).

COMPARATIVE EXAMPLE 5

Some stainless steel plates are cathodically cleaned to remove any naturally occurring passivating and insulating oxides. The plates are then coated with a conductive polymeric coating such as those disclosed in U.S. Pat. No. 6,372,376. These plates do not have a titanium layer adjacent to the conductive polymeric coating. The plates are then soaked in a simulated fuel cell solution of pH=3 at 90° C. for 12 weeks. The plates do exhibit significant debonding failures after 12 weeks of soaking in the simulated fuel cell solution in accordance with the tape adhesive test (ASTM No. D 3359).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of manufacturing a fluid distribution plate comprising:
    providing a metallic plate body having a body defining a set of fluid flow channels configured to distribute flow of a fluid across at least one side of the fluid distribution plate wherein the metallic plate body includes lands adjacent the channels;
    forming a metal-containing adhesion promoting layer having a thickness less than 100 nm on the metallic plate body, the metal-containing adhesion promoting layer including a pure valve metal layer or a valve metal-containing alloy layer; and
    forming a composite polymeric conductive layer disposed on the metallic layer such that the adhesion promoting layer adheres the composite polymeric conductive layer to the metallic plate body wherein the metal-containing adhesion promoting layer in the channels is substantially free of composite polymeric conductive material disposed thereon.

2. The method of claim 1 wherein the step of disposing a metal-containing adhesion promoting layer on the body comprises depositing a metal on the metallic plate body via physical vapor deposition.

3. The method of claim 1 wherein the valve metal is selected from the group consisting of titanium, zirconium, tantalum, niobium and mixtures thereof.

4. The method of claim 1 wherein the metallic plate body comprises stainless steel.

5. A method of manufacturing a fluid distribution plate, the method comprising:
    providing a metallic plate body defining a set of fluid flow channels configured to distribute flow of a fluid across at least one side of the fluid distribution plate wherein the metallic plate body includes lands adjacent the channels;
    forming a metal-containing adhesion promoting layer having a thickness less than 75 nm on the metallic plate body, the metal-containing adhesion promoting layer comprising a valve metal selected from the group consisting of titanium, zirconium, tantalum, niobium and mixtures thereof, the metal-containing adhesion promoting layer including a pure valve metal layer or a valve metal-containing alloy layer; and
    forming a composite polymeric conductive layer on the metal-containing adhesion promoting layer such that the metal-containing adhesion promoting layer adheres the composite polymeric conductive layer to the metallic plate body wherein the metal-containing adhesion promoting layer in the channels is substantially free of composite polymeric conductive material disposed thereon.

6. The method of claim 5 wherein the metal-containing adhesion promoting layer further includes an outer surface portion comprising a metal oxide layer, wherein the outer surface portion is present in an amount that does not substantially increase total contact resistance of the metallic plate body relative to a plate body not having the outer surface portion.

7. The method of claim 5 wherein the metal is titanium.

8. The method of claim 5 wherein the metal is zirconium.

9. The method of claim 5 wherein the metal is niobium.

10. The method of claim 5 wherein the metal is tantalum.

11. The method of claim 5 wherein the metal-containing adhesion promoting layer is disposed on the metallic plate body by physical vapor deposition.

12. The method of claim 6 wherein the metal oxide is titanium oxide.

13. The method of claim 5 wherein the metallic plate body comprises stainless steel.

14. The method of claim 5 wherein the fluid distribution plate has a spreading pressure of at least 200 dyne/centimeters.

* * * * *